United States Patent [19]

Kato et al.

[11] Patent Number: 4,627,759
[45] Date of Patent: Dec. 9, 1986

[54] SCREW TYPE CONNECTOR SET

[75] Inventors: Shinichi Kato; Kiyoto Watanabe, both of Atsugi; Yoji Saito; Akio Yamagata, both of Gotenba, all of Japan

[73] Assignees: Nissan Motor Company, Ltd., Yokohama; Yazaki Corporation, Tokyo, both of Japan

[21] Appl. No.: 620,302

[22] Filed: Jun. 13, 1984

[30] Foreign Application Priority Data

Jun. 17, 1983 [JP] Japan ............................ 58-92025[U]

[51] Int. Cl.4 .................... F16D 9/00; F16P 5/00
[52] U.S. Cl. ...................................... 403/2; 403/13;
 403/21; 403/343; 403/405.1; 339/92 M;
 339/186 M
[58] Field of Search ............... 403/2, 13, 14, 21, 343,
 403/405.1, 24; 339/92 M, 184 R, 184 M, 186 R,
 186 M; 411/916

[56] References Cited

U.S. PATENT DOCUMENTS

| 1,609,700 | 5/1928 | Egbert | 411/916 X |
|---|---|---|---|
| 2,060,593 | 11/1936 | Schaurte et al. | 411/916 X |
| 2,083,054 | 6/1937 | Cline | 411/916 X |
| 3,281,761 | 10/1966 | Moulin | 339/186 R |
| 3,399,374 | 8/1968 | Pauza et al. | 339/184 M |
| 3,582,867 | 6/1971 | Thompson | 339/92 M |
| 3,662,321 | 5/1972 | Bury | 339/92 M |
| 3,675,185 | 7/1972 | Ruehlemann et al. | 339/186 M |
| 3,747,196 | 7/1973 | Whittington | 403/2 X |
| 3,771,108 | 11/1973 | Haffner et al. | 339/186 M X |
| 4,179,179 | 12/1979 | Lowden | 339/92 M |
| 4,181,391 | 1/1980 | Kilsdonk | 339/92 M |
| 4,437,427 | 3/1984 | Mampaeij | 403/2 X |
| 4,479,691 | 10/1984 | Smith, Jr. | 339/186 M X |
| 4,483,575 | 11/1984 | Krüger et al. | 339/92 M |

OTHER PUBLICATIONS

"Continental Connectors", 3/1962, Electronic Design p. 259.
"Hughes Universal Connector", 12/1960, Electro-Technology p. 26.

Primary Examiner—Thomas F. Callaghan
Assistant Examiner—Todd G. Williams
Attorney, Agent, or Firm—Armstrong, Nikaido Marmelstein & Kubovcik

[57] ABSTRACT

A new type connector set is provided. Its male connector member includes a male housing having an engaging portion in the form of a nut. The female connector member includes a female housing with an opening to receive said male housing therethrough, a support member fixed within said female housing and having a chamber to receive the engaging portion of the male housing in it and a bolt rotatably extending within said chamber to be screwed into the nut. Said bolt is prevented from moving in an axial direction thereof and has a constricted portion in it.

10 Claims, 4 Drawing Figures

SCREW TYPE CONNECTOR SET

BACKGROUND OF THE INVENTION

The present invention relates to a screw type connector set, in which coupling connector housings formed of synthetic resin have a bolt and a nut.

In fitting opposed connector housings, there is required force corresponding to the sum of force required to connect all the terminals and force to overcome the friction and the locking resistance between connector housings. In the case of a large-sized multi-pole connector, this resistance becomes large to the extent that the manual fitting operation is no longer possible, requiring the tightening two connector members by bolt and nut.

However, an excessive tightening of the bolt can result in breakage of the connector housing, or even if it does not cause breaking of the connector housings, the threaded portion of the bolt may be broken and make it impossible to separate the opposed connector housings.

SUMMARY OF THE INVENTION

It is therefore an object of the present invention to provide a screw type connector set in which the bolt provided in one of the connector housings has a portion intentionally made susceptible to breakage before the connector housings or the threaded portion of the bolt are broken.

In order to realize the foregoing object, there is essentially provided a screw type connector set comprising a first connector member including a first housing, said first housing having an engaging portion in the form of a nut; and a second connector member including a second housing with an opening to receive said first housing, therethrough, a support member fixed within said second housing and having a chamber to receive said engaging portion of the first housing therein; and a bolt rotatably extending within said chamber to be screwed into the nut, said bolt having a constricted portion therein.

BRIEF DESCRIPTION OF THE DRAWINGS

The object and the advantage of the present invention will be apparent from the following description with reference to the drawings wherein.

DETAILED DESCRIPTION OF THE EMBODIMENTS

Figure 1:
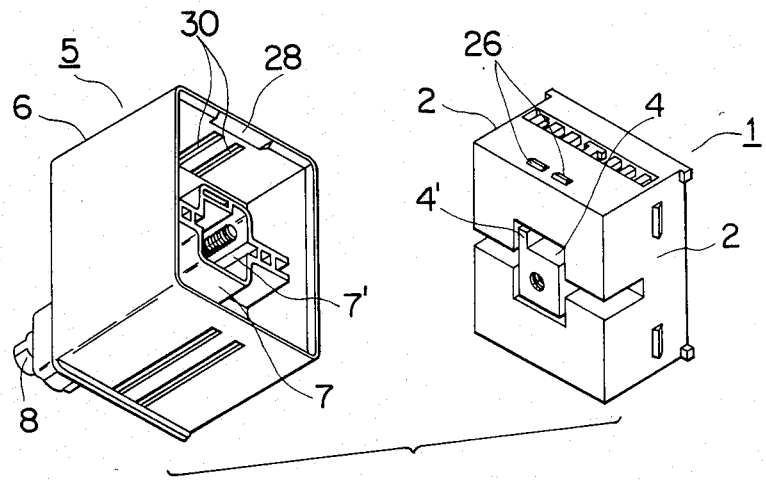
FIG. 1 is a perspective view of a connector set including a male connector member and a female connector member of the invention.

In FIG. 1, the numeral 1 denotes a male connector member including a housing 2 fixed to an automobile or the like. Said housing 2 is centrally provided with an engaging portion in the form of a nut 4, and the numeral 5 denotes a female connector member including a housing 6 with an opening to receive said male connector member 1 therethrough. Said housing 6 has a support member 7 fixed therewithin. Said support member 7 has a chamber 7' to receive the nut 4 therein.

Figure 2:
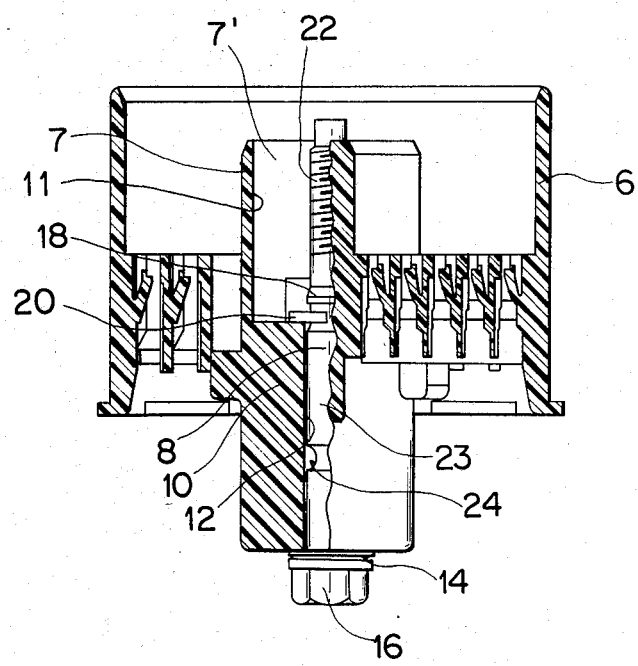
FIG. 2 is a sectional view of the female connector member in one embodiment of the present invention.

As shown in FIG. 2, a bolt 8 is rotatably positioned centrally in said chamber 7' through large and small diameter sections 11 and 12 thereof. Said support member 7 is positioned at the central portion of the female connector housing 6, and its head portion 16 engages the back side of the shaft support portion 10 of the support member 7 through a spring washer 14. The clamping bolt 8 is held by the support member 7 in the female connector housing 6 while its axial movement is prevented by engagement of a stopper 20—which is retained in a tapered stepped portion 18. Said bolt 8 has a threaded portion 22 extending in the large diameter section 11 and a support portion 23 snugly received by said small diameter section 12. Said support portion 23 has a constricted portion 24 which is susceptible of breakage.

In the above construction, as the male and female connector housings 2 and 6 are opposed to each other and the bolt 8 is screwed into the nut 4 for tightening, the fitting operation of the connector housings 2 and 6 is performed until it is completed upon the intended contact of both fitting surfaces.

In case where the tightening operation is continued with an extra torque after the fitting, excessive torsion and tensile force tend to be exerted on the bolt 8 while an excessive compressive force is applied also to the connector housings 2 and 6.

Since the strength of the constricted portion 24 is set weaker than the strength of any other member including the connector housings, it will be the first to be broken. The bolt 8 thus broken is divided into a piece on the back side and a piece on the front side, the former falling through the small diameter section 12. In such a case, a new bolt and a stopper are replaced to be mounted to the female connector housing. The threaded portion 22 remaining in the mating male connector can be removed with a jig.

Figure 3:
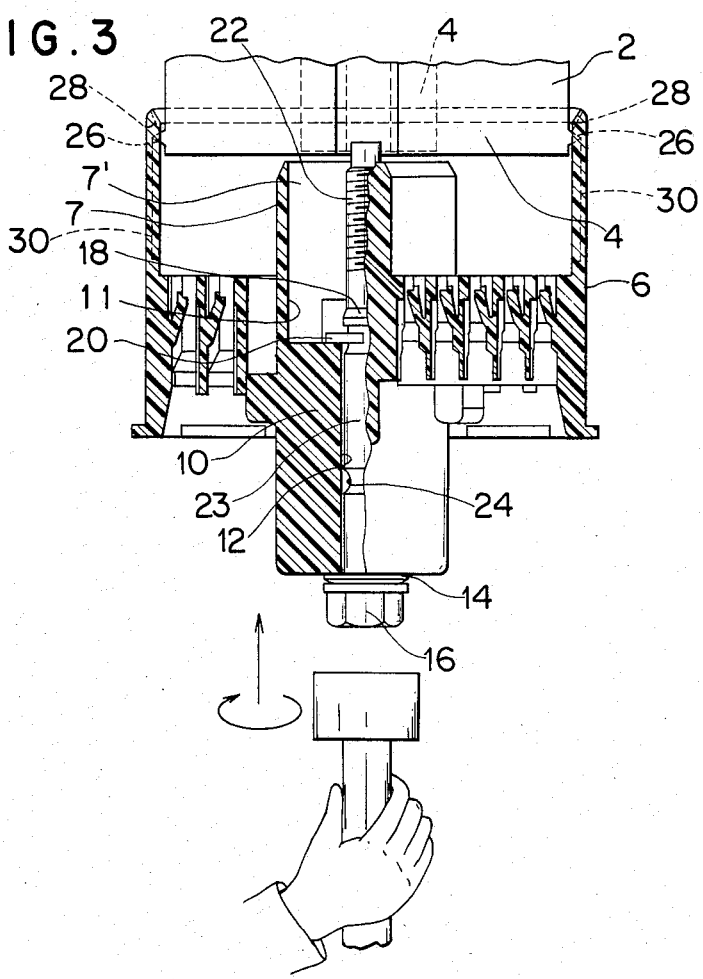
FIG. 3 is a sectional view of the female connector member in another embodiment of the present invention.

Referring now to FIG. 3 together with FIG. 1, said male connector housing 2 is formed with projections 26 in an outer surface thereof. Correspondingly thereto, the female connector housing 6 has slots 30 in an inner surface thereof to extend parallelly with the bolt 8. Said female connector housing 6 further has tapered guide portions 28 formed in inner rims thereof such that said slots 30 are located slightly away from said tapered guide portions 28.

Therefore, as the female connector housing 6 is pushed against the fixed male connector housing 2, the projections 26 engages the interior of the retaining slots 30 through the tapered guide portion 28 and immediately assumes a temporarily fixed state to align the bolt and the nut. Then, as the bolt 8 is turned and engaged with the nut 4 by means of a jig, the fitting operation of both connector housings 2 and 6 proceeds such that the projections 26 move along the retaining slots 4 until a perfect engagement of both connector housings is finally attained.

In the above temporarily engagement, a tip end of the bolt 8 abuts the nut 4, thus preventing contact or temporary engagement of terminals in both connector housings 2 and 6. In this way, the temporarily engagement will not cause conduction between the terminals. Since the connectors will not pass the circuit continuity test in such a situation, it is possible to assure that the screwing operation is to be performed.

Figure 4:
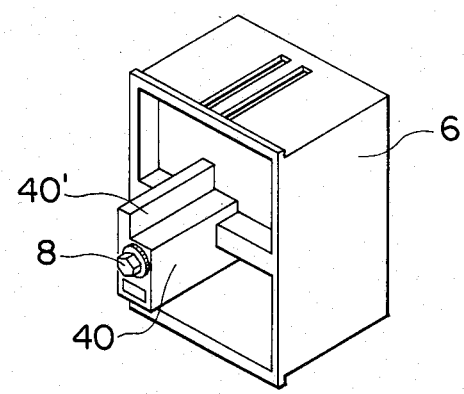
FIG. 4 is a perspective view of the female connector member in a further embodiment of the present invention.

Referring back to FIG. 1, said chamber 7' has an irregular shape as depicted. The nut 4 to be inserted into said chamber 7' also has a corresponding irregular shape by having a shouldered portion 4' therein. Further, the female connector housing 6 has an orientation indicator member 40 on the rear side thereof as shown in FIG. 4. Said orientation indicator member 40 has a shouldered portion 40' which corresponds to said shouldered portion 4' of the nut 4.

In the above constrution, the male connector housing 2 is fixed by screwing the bolt 8 into the nut 4 for tightening. In this way, the orientation of the female connector housing 6 is confirmed by the orientation indicator member 40 provided on the rear side thereof. This eliminates the need for the operator holding the female housing to turn the same and see its inside immediately before the engaging operation.

What is claimed is:

1. A screw type connector set comprising:
   a first connector member including a first housing, said first housing having an engaging portion in the form of a nut; and
   a second connector member including a second housing, a support member fixed within said second housing and having a chamber to receive said engaging portion of the first housing therein, and a bolt rotatably extending within said chamber to be screwed into the nut, said bolt having a tapered stepped portion therein, and a stop member engaging said tapered stepped portion to prevent axial movement of said bolt relative to said second connector; and
   said bolt having a constricted portion therein weaker than said connector members, whereby excessive torison applied to tightening said bolt will cause it to break at said restricted portion and permit disassembly of said first and second connectors.

2. A screw type connector set according to claim 1, wherein said bolt includes a threaded portion and a support portion.

3. A screw type connector set according to claim 2, wherein said chamber in the support member includes a large diameter section to receive the engaging portion of the first housing and a small diameter section to snugly receive said support portion of the bolt.

4. A screw type connector set according to claim 3, wherein said constricted portion is formed in said support section.

5. A screw type connector set according to claim 1, wherein said first housing and said second housing have retention means for temporarily retaining each other to align said bolt and nut.

6. A screw type connector set according to claim 5, wherein said retention means includes at least one projection provided in an outer surface of said first housing, a slot formed in an inner surface thereof to extend parallel with said bolt and a tapered guide portion formed in an inner rim of said first housing to guide said at least one projection into said slot at the time of engagement.

7. A screw type connnector set according to claim 1, wherein said engaging portion of the first housing has an irregular shape and said second housing carring a member having a substantially identical shape and orientation to said engaging portion.

8. A screw type connector set comprising
   a first connector member including a first housing, said housing having an engaging portion in the form of a nut; and
   a second connector member including a second housing with an opening to receive said first housing therethrough, support member fixed within said second housing and having a chamber therein to receive said engaging portion of the first housing, and a bolt extending within said chamber to be screwed into the nut, said first housing and said second housing having retention means for temporarily retaining each other to align said bolt and nut, said second connector member having a stop means engagable with a portion of said bolt having a tapered-stepped portion to prevent axial movement of said bolt relative to said second connector, and said bolt having a portion with a constricted diameter weaker than said connecting members, whereby excessive torison applied to tightening said bolt will cause it to break at said restricted portion and allow disassembly of said connector members.

9. A screw type connector set according to claim 8, wherein said retention means includes at least one projection provided in an outer surface of said first housing, a slot formed in an inner surface thereof to extend parallel with said bolt and a guide groove formed in an inner rim of said first housing to guide said at least one projection into said slot at the time of engagement.

10. A screw type connector set comprising
    a first connector member including a first housing, said first housing having an engaging portion in the form of a nut; and
    a second connector member including a second housing with an opening to receive said first housing therethrough, a support member fixed within said second housing and having a chamber to receive said engaging portion of the first housing, and a bolt extending within said chamber to be screwed into the nut, said engaging portion of the first housing has an irregular shape and said second housing carrying a member having a substantially identical shape and orientation to said engaging portion, said second connector member having a stop means engagable with a tapered-stepped portion of said bolt to prevent axial movement of said bolt relative to said second connector, and said bolt having a portion of constricted diameter weaker than said connecting members, whereby excessive torison applied to tightening said bolt will cause it to break at said restricted portion and allow disassembly of said connecting members.

* * * * *